US000001999B1

(19) United States

(12) Statutory Invention Registration (10) Reg. No.: US H1999 H

Newill et al. (43) Published: Nov. 6, 2001

(54) TUNING SABOTED PROJECTILE PERFORMANCE THROUGH BOURRELET MODIFICATION

(75) Inventors: James F. Newill, Landenberg, PA (US); Christopher P. R. Hoppel, Havre de Grace; William H. Drysdale, Aberdeen, both of MD (US)

(73) Assignee: The United States of America as represented by the Secretary of the Army, Washington, DC (US)

(21) Appl. No.: 09/261,761

(22) Filed: Mar. 3, 1999

(51) Int. Cl.[7] ..... F42B 14/06

(52) U.S. Cl. ..... 102/521

(58) Field of Search ..... 102/520–523

(56) References Cited

U.S. PATENT DOCUMENTS

| | | | | |
|---|---|---|---|---|
| H165 | * | 11/1986 | Silsby | 102/520 |
| H1412 | * | 2/1995 | Kline et al. | 102/521 |
| 2,998,780 | * | 9/1961 | Anspacher et al. | 102/523 |
| 4,187,783 | * | 2/1980 | Campoli et al. | 102/520 |
| 4,326,464 | * | 4/1982 | Price | 102/523 |
| 4,408,538 | * | 10/1983 | Deffayet et al. | 102/522 |
| 4,941,244 | * | 7/1990 | Ortmann et al. | 102/521 |
| 5,025,731 | * | 6/1991 | Meyer et al. | 102/521 |
| 5,103,735 | * | 4/1992 | Kaste et al. | 102/521 |
| 5,196,650 | * | 3/1993 | Cutron | 102/521 |
| 5,313,889 | * | 5/1994 | Wilkerson et al. | 102/521 |

FOREIGN PATENT DOCUMENTS

| | | | | |
|---|---|---|---|---|
| 3904626 | * | 8/1990 | (DE) | 102/521 |
| 86711 | * | 8/1983 | (EP) | 102/521 |
| 3704027 | * | 8/1988 | (EP) | 102/521 |
| 417012 | * | 3/1991 | (EP) | 102/521 |

* cited by examiner

*Primary Examiner*—Harold J. Tudor

(74) *Attorney, Agent, or Firm*—Paul S. Clohan, Jr.

(57) ABSTRACT

Kinetic energy projectiles including sabots having stiffened bourrelets which tune and improve shot performance. Shot dispersion for the projectiles is decreased by reducing adverse dynamic perturbations imparted to the projectiles during projectile launch. Reducing dynamic perturbations is accomplished by better controlling interior ballistics by changing the stiffness of the sabot bourrelets.

33 Claims, 12 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TUNING SABOTED PROJECTILE PERFORMANCE THROUGH BOURRELET MODIFICATION

GOVERNMENT INTEREST

The invention described herein may be manufactured, used and/or licensed by or for the United States Government.

BACKGROUND OF THE INVENTION

1. Field of the Invention

The present invention relates generally to saboted projectiles and, more particularly, to a method of improving the in-bore performance of kinetic energy projectiles. By better controlling the interior ballistic processes of the projectile, adverse dynamic perturbations to the projectile during launch are minimized. Most particularly, the in-bore performance of kinetic energy projectiles is improved through modification of the projectile's bourrelet, thus providing improved shot accuracy for the projectiles.

2. Description of the Related Art

Kinetic energy ammunition is comprised of two main parts: the projectile portion that flies down the gun tube; and the portion that remains in the gun or is combusted during firing (cartridge case, case base, base adapter and propellant). The projectile further comprises several parts including: the sabot; the obturator; the seal; and the sub-projectile penetrating rod. As such, the sabot is part of the launch package that carries the sub-caliber projectile, such as a long-rod penetrator, during bore travel in the gun barrel when fired.

Sabots serve several important functions during the short time spent inside the gun bore (roughly 6 milliseconds of in-bore time for the M256 120-mm tank cannon), after which, at the end of the gun tube, the sabot must be gently discarded in order not to interfere with the flight of the sub-projectile. First, the sabot, along with the gas seal and obturator, must seal the gun bore to contain the high-pressure propellant gases between the rod and the gun tube. Second, the sabot must support the sub-projectile during high axial acceleration and load during launch. In fact, the axial acceleration and loads during launch are high enough to fail the penetrator rod in either compression or tension. Third, the sabot provides the suspension which controls the ride of the projectile down the gun tube. Finally, the sabot must also gently discard from the projectile soon after muzzle exit without disturbing the sub-projectile flight. The only part of the projectile that reaches the target is the sub-projectile rod. This means that any other part of the projectile (the sabot, obturator, and seals) is parasitic in nature. Since the effectiveness of the rod is directly related to the velocity on target, it is paramount that the sabots, seal, and obturator are as light as possible so they do not reduce the kinetic energy available to the rod.

The sabot typically includes a forward bore riding bourrelet or support and an aft bore riding bourrelet or support. Although all sabots do not have both a forward and an aft bourrelet, all sabots must have at least one bourrelet in order to function properly. The aft bourrelet is a solid cylindrical structure which, along with the obturator, forms a seal for propellant gases. The propelling gases push against the aft face of the aft bourrelet to push the projectile through the gun tube. The forward bourrelet is spaced apart from the aft bourrelet and includes a scoop to catch onrushing air upon projectile exit from the gun tube. The scoop-shaped forward bourrelet thus permits the onrushing air to separate the segments or petals of the sabot from the fin stabilized long rod penetrator upon flight.

During projectile ride down the gun tube, the front and aft bourrelets contact the inner surface of the gun tube. These bourrelet surfaces act as the suspension for the projectile during launch. To improve and ensure shot accuracy, the dispersion of the projectile with respect to the fire precision must be decreased. Dispersion is the area covered by a group of shots at the target.

When a projectile is fired it usually does not go exactly where the gun is aimed for a variety of reasons. The vector from the line of fire to the impact on the target is defined as the projectile "jump." Projectile jump is comprised of a number of components that correlate to different aspects of launch and flight. The present invention is directed towards tuning the in-bore performance of projectiles so that shot accuracy is improved by minimizing the projectile's transverse linear velocity and transverse angular rates relative to the gun bore at shot exit from the gun tube. The present invention fulfills this need for both new projectiles being developed and for ammunition already in production through modification of the forward and/or aft bourrelets. It has been shown that changing the stiffness of the bourrelets can minimize transverse velocity and angular spin rates thus minimizing shot dispersion for saboted projectiles. The ability to control the interior ballistic processes to minimize adverse dynamic perturbations to the projectile during the launch represents a major step toward "designing in" accuracy for projectiles.

SUMMARY OF THE INVENTION

The general objective of this invention is to change the stiffness of a saboted projectile's bourrelets to improve the in-bore performance of the projectile and thereby minimize dispersion with respect to the fire precision. The present invention has resulted in a 20% decrease in shot dispersion for certain saboted projectiles. It has been found that the performance of a projectile can be optimized by tuning the stiffness of the bore riding surfaces. This can be achieved by increasing or decreasing the stiffness of the bourrelets. To attain an increase in bourrelet stiffness, the present invention contemplates a variety of parts affixed to the sabot to provide a means for stiffening the bourrelet. Generally, these parts comprise inserts which are affixed to the sabot's bourrelet. Various embodiments of these inserts have been envisioned, including a segmented disk, spokes or ribs, and a solid ring, each of which can be affixed to the bourrelet to provide stiffening thereof The stiffness of the bore-riding surfaces can be decreased if necessary by machining material away from the bourrelets.

Accordingly, it is an object of the present invention to provide a method of tuning and improving the in-bore performance of saboted projectiles by changing the stiffness of the sabot's bourrelets.

It is a further object of the present invention to provide a method of tuning and improving the in-bore performance of saboted projectiles which have already been produced and/or fielded.

It is a still further object of the present invention to provide a method of minimizing shot dispersion with respect to the fire precision for saboted projectiles by minimizing the projectile's transverse velocity and angular spin rates.

It is yet a further object of the present invention to provide a saboted projectile having means for stiffening the bourrelets.

It is still a further object of the present invention to provide a saboted projectile having stiffening inserts affixed to the sabot's bourrelet.

It is a still further object of the present invention to provide a segmented disk insert, spoke or rib inserts, or a solid ring insert, affixed to the sabot's bourrelet in a manner to provide stiffening of the bourrelet.

The foregoing and other objects and advantages of the present invention will hereafter become more fully apparent from the following detailed description. In the description reference is made to the accompanying drawings which form a part hereof, and in which there is shown by way of illustration, and not limitation, preferred embodiments. Such description does not represent the fill extent of the invention, but rather the invention may be employed in different arrangements according to the breadth of the invention as defined in the appended claims.

DETAILED DESCRIPTION OF THE PREFERRED EMBODIMENTS

In order to understand shot accuracy, the entire process of projectile launch and flight must be understood. The vector from the line of fire to the impact is defined as the projectile jump. It is convenient to break this vector up into a series of parts that correlate with different aspects of launch and flight. When this is done, jump is defined as $$JUMP=MP+CV+CG+SD+AJ+GD$$

wherein,

MP=Muzzle Pointing Angle: The direction the end of the gun tube is pointing when the projectile exits the gun;

CV=Crossing Velocity Jump: The velocity of the muzzle of the gun tube at projectile exit;

CG=Center-of-Gravity Jump: The velocity of the CG of the flight projectile at muzzle exit relative to a coordinate frame attached to the muzzle;

SD=Sabot Discard Disturbance: The change in the trajectory of the flight projectile due to disengagement of the sabot from the flight projectile;

AJ=Aerodynamic Jump: The jump associated with integrating the angle of attack of the flight projectile during the time of flight; and GD=Gravity Drop: The amount the flight projectile drops due to gravity during the time of flight.

The total center-of-gravity jump (CG total) represents the transverse velocity of the flight projectile relative to an inertial coordinate system and is given by $$CG\ total=MP+CV+CG.$$

Using these definitions, the two jump components which come from the in-bore dynamics of the projectile are center-of-gravity jump (CG) and aerodynamic jump (AJ). Total CG jump is related to transverse velocity at muzzle exit, while the initial angular rate at muzzle exit is related to aerodynamic jump.

Figure 1A:
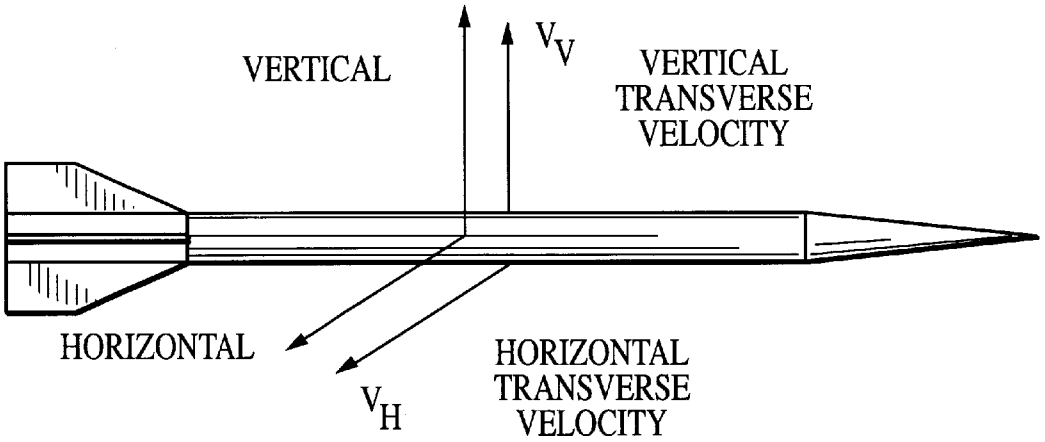
FIG. 1*a* shows and defines vertical and horizontal transverse velocity which may be imparted to a sub-projectile rod during launch.
Figure 1B:
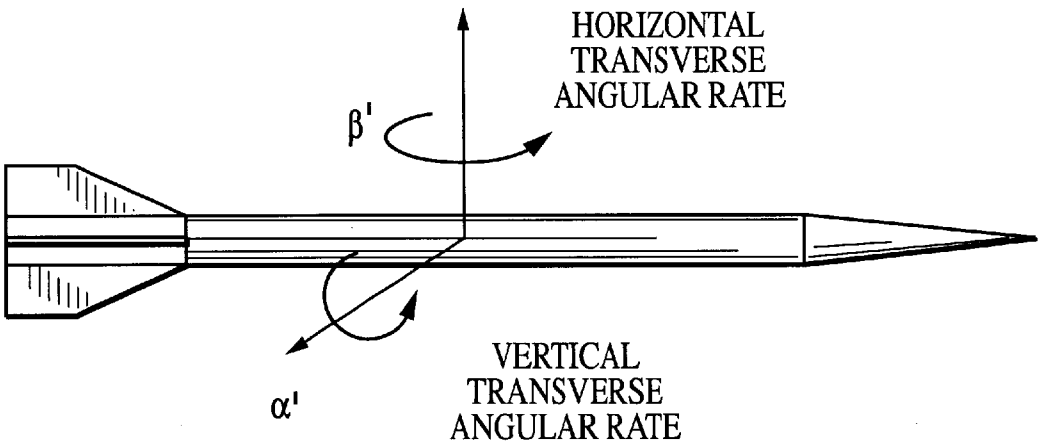
FIG. 1*b* shows and defines vertical and horizontal transverse angular rates which may be imparted to a sub-projectile rod during launch.
Figure 2:
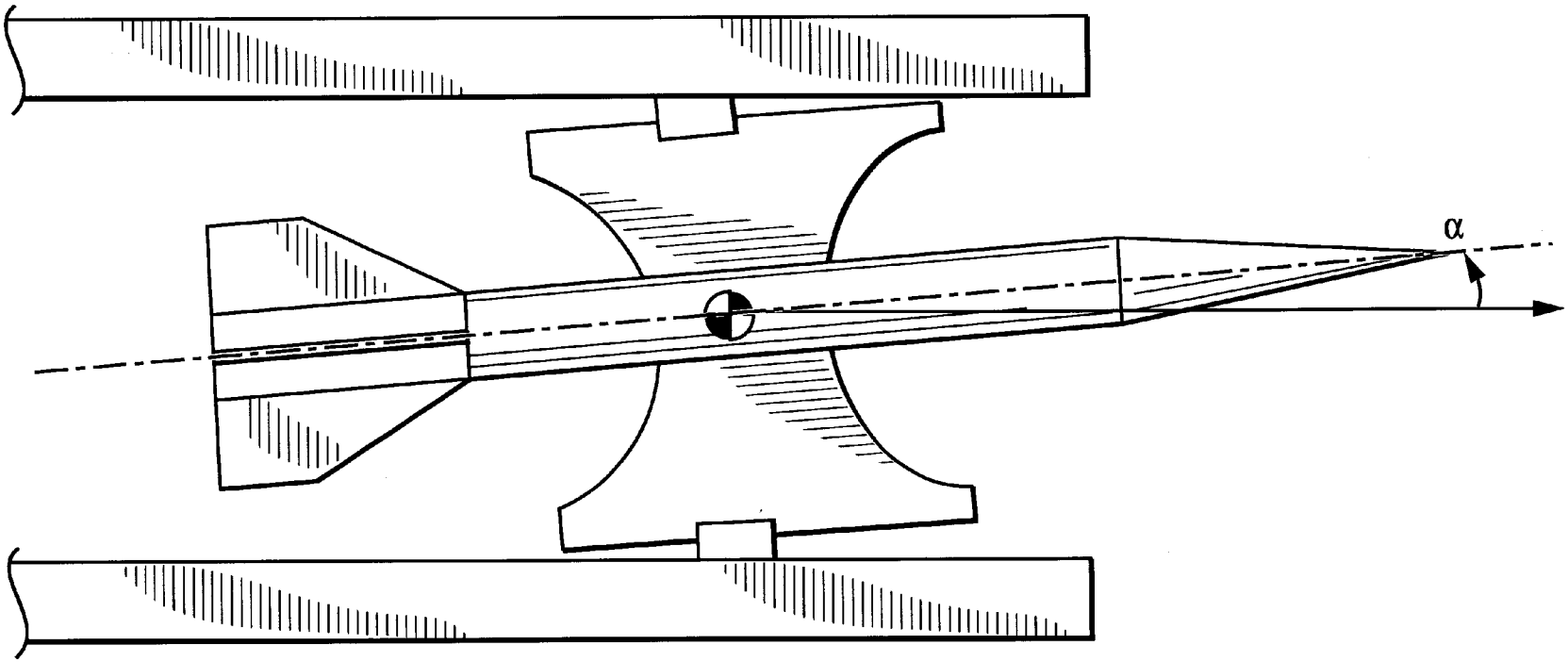
FIG. 2 shows the sub-projectile's dynamic state at the gun's muzzle with $\alpha$ representing the angular deviation of the sub-projectile rod from the barrel centerline.

Referring now to the drawings, wherein like reference numerals designate like or corresponding parts throughout the several views, there is shown in FIGS. 1*a* and 1*b* the definition of transverse velocity and angular rate for the penetrator rod sub-projectile. FIG. 2 shows the dynamic state of a projectile at the muzzle exit, with $\alpha$ representing the angle at which the sub-projectile deviates from the barrel centerline. It should be noted that during the in-bore launch, the projectile could move independently of the tube. For sabots having two bourrelets, two parts of the sabot contact the inner surface of the gun tube, the forward bourrelet 14 and the rear bourrelet 19 shown in FIG. 3. There are small clearances between the projectile bourrelets and the inner diameter of the gun tube, and the bourrelets will deform under launch loads as depicted in FIG. 2.

These bourrelet surfaces act as the suspension for the projectile during launch, and to ensure shot accuracy, the forward bourrelet 14 and/or aft bourrelet 19 may be "tuned" to minimize the transverse velocity and angular rates at shot exit. This tuning is accomplished by changing the stiffness of either or both forward bourrelet 14 and/or aft bourrelet 19, although in the preferred embodiment it is preferred that only forward bourrelet 14 be stiffened. The forward bourrelet 14 must also generate the lift to initiate sabot 10 discard during flight. It should be recognized that changing the physical characteristics or design of the bourrelets 14 and 19 during engineering development of the projectile is a difficult and expensive process. Moreover, retrofitting new sabots onto projectiles which have already been produced is an even more difficult process requiring disassembly and downloading (removal of propellant) of the rounds and discarding the old sabots. The present invention provides a method for stiffening the bourrelets of already existing projectiles without a redesign and retrofit of the existing round.

Figure 3:
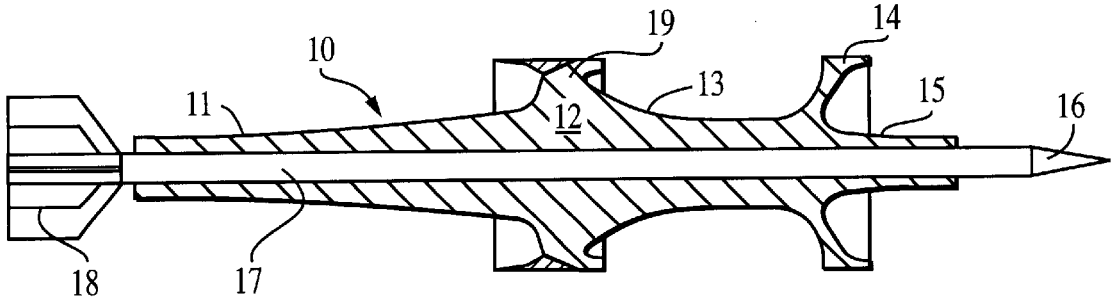
FIG. 3 is a longitudinal sectional side view of a typical double-ramp saboted projectile having both forward and aft bourrelets.

In FIG. 3 there is shown a conventional double-ramp saboted kinetic energy projectile 10. Saboted projectile 10 includes an elongated long-rod penetrator rod or sub-projectile 17 of generally circular cross-section throughout most of its body and on which are attached stabilizing fins 18 at the aft end thereof Sub-projectile 17 is generally symmetric about its longitudinal axis. A double-ramp sabot 12 is fixed on the outer surface of the sub-projectile 17. Sabot 12 includes five distinct regions: an aft ramp 11; a rear or aft bourrelet 19; a forward ramp saddle 13; a forward bourrelet 14; and a forward ramp 15. The sub-caliber projectile includes a tip or windshield 16 at its forward end. The sabot 12, like the sub-projectile 17, is symmetric with respect to the longitudinal axis of the projectile.

Figure 4:
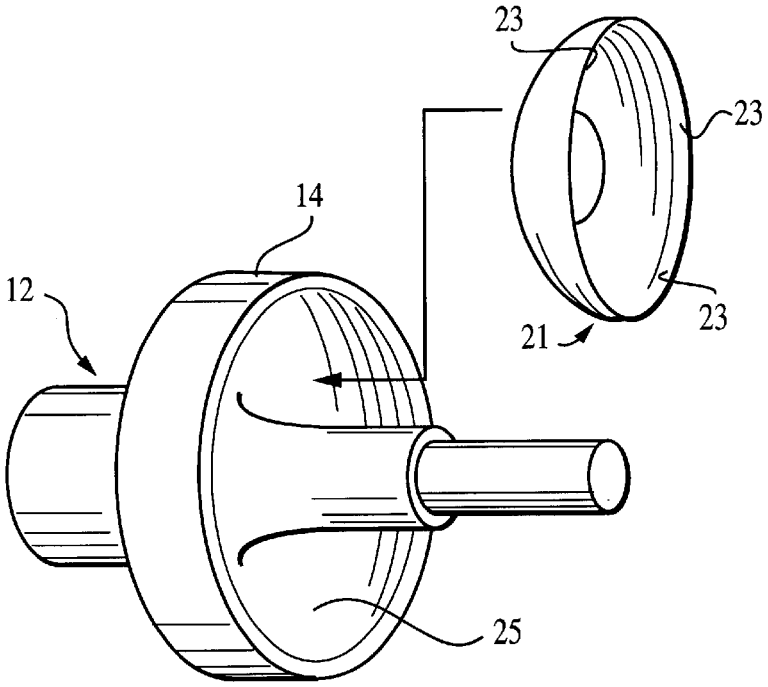
FIG. 4 shows a perspective view of the front section of a sabot including a forward bourrelet having a segmented disk insert affixed thereto to provide stiffening of the bourrelet.
Figure 5:
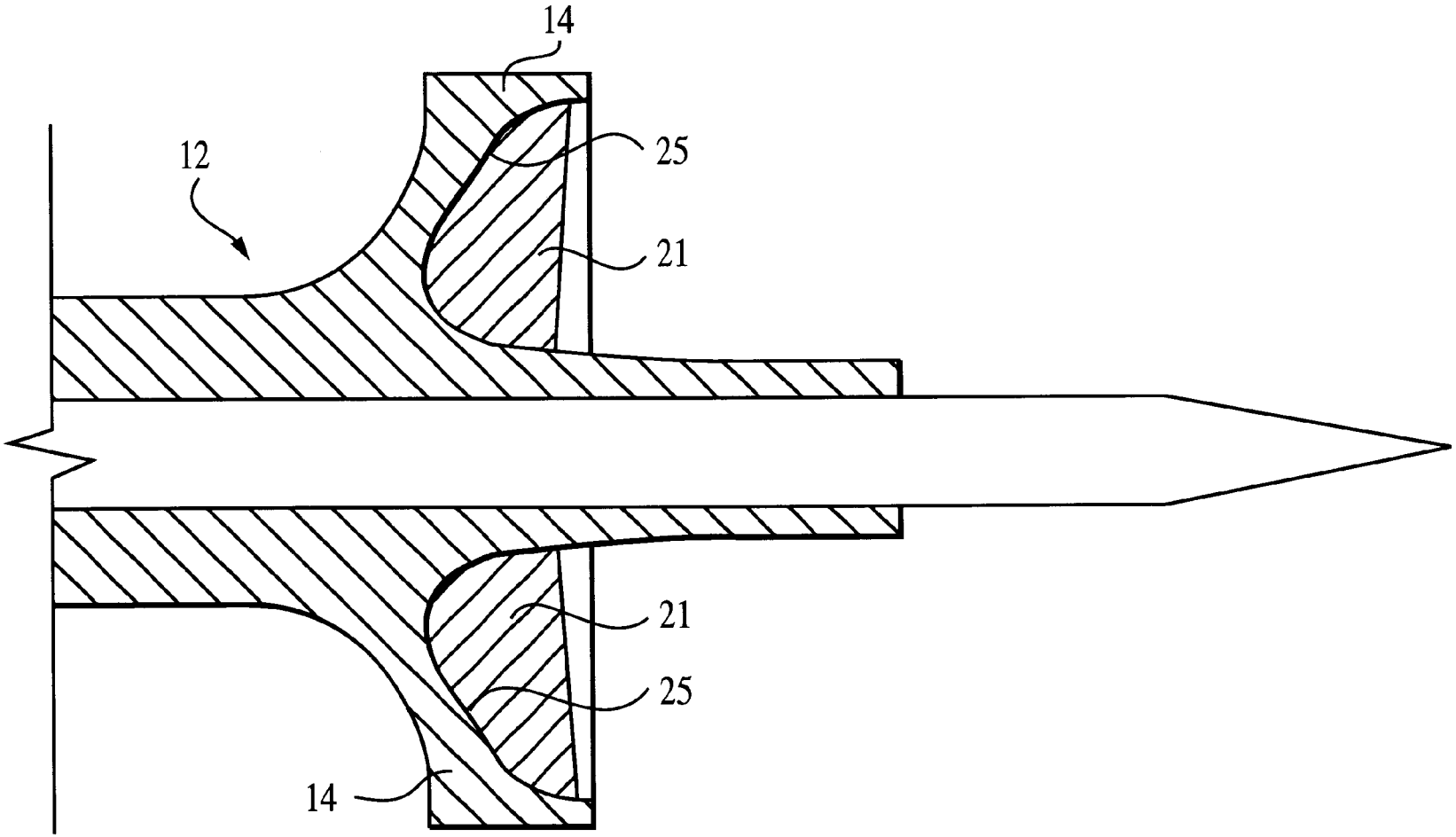
FIG. 5 is a longitudinal sectional side view of the front section of the sabot of FIG. 4 showing the disk insert inside the scoop of the forward bourrelet.
Figure 6:
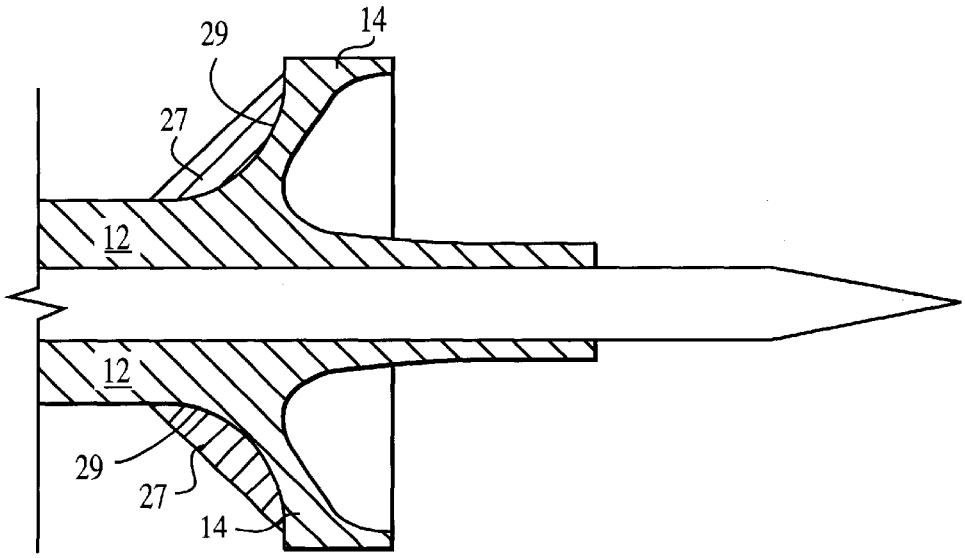
FIG. 6 is a longitudinal sectional side view of the front section of a sabot showing a disk insert attached behind the forward bourrelet.

It should be noted that not all sabots have all five regions as identified above. However, in order to function every sabot must have at least one bourrelet. In order carry-out the objectives of the present invention for an existing or fielded projectile, a part or insert must be fastened or affixed to the sabot 12 to change the stiffness of the sabot bourrelets 14 and 19. In preferred embodiments, only the forward bourrelet 14 is stiffened by the additional part or insert. Referring now to FIG. 4, a perspective view is provided of the front section of a sabot 12 which includes forward bourrelet 14. One embodiment which provides stiffening of the forward bourrelet 14 comprises a disk-shaped insert 21 which can be affixed to the inside surface or scoop 25 of the forward bourrelet 14. The disk 21 preferably comprises three identical segmented sections 23, of 120 degrees each, so that each segment can be affixed directly to the three independent sabot petals (or 120-degree sections) of a typical sabot 12. In this way, each insert segment 23 can be affixed to the sabot 12 without interfering with aerodynamic discard during flight. The insert 21 can be made of homogenous materials such as metals, plastics, or ceramics. On the other hand, insert 21 can also be made of multiple layers of anisotropic materials such as composites. All of these materials are well known to those of ordinary skill in the art. The use of composites allows for the properties of the material to be tailored to achieve desired characteristics in specific directions. That is, the fiber reinforcement in the composite materials can be oriented to provide stiffness in the necessary directions. FIG. 5 provides a longitudinal sectional side view of the sabot 12 of FIG. 4 having the forward bourrelet 14 with disk insert 21 affixed to the forward scoop surface 25. As an alternative embodiment, FIG. 6 shows the forward bourrelet 14 having a disk insert 27 affixed to the rear surface 29 of the forward bourrelet 14.

Figure 7A:
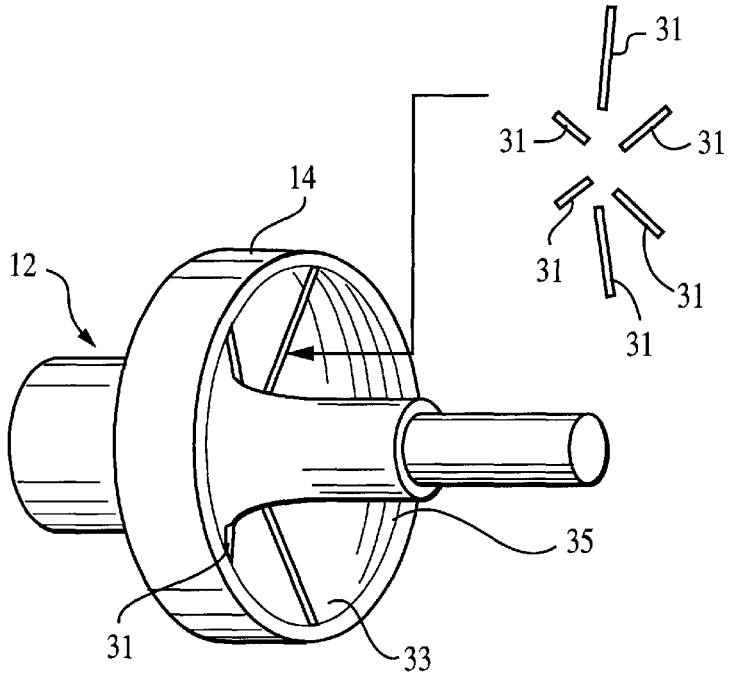
FIG. 7*a* is a perspective view showing spoke inserts placed between the inner circumferential surface of the forward bourrelet and the front ramp to provide radial stiffening of the bourrelet.
Figure 7B:
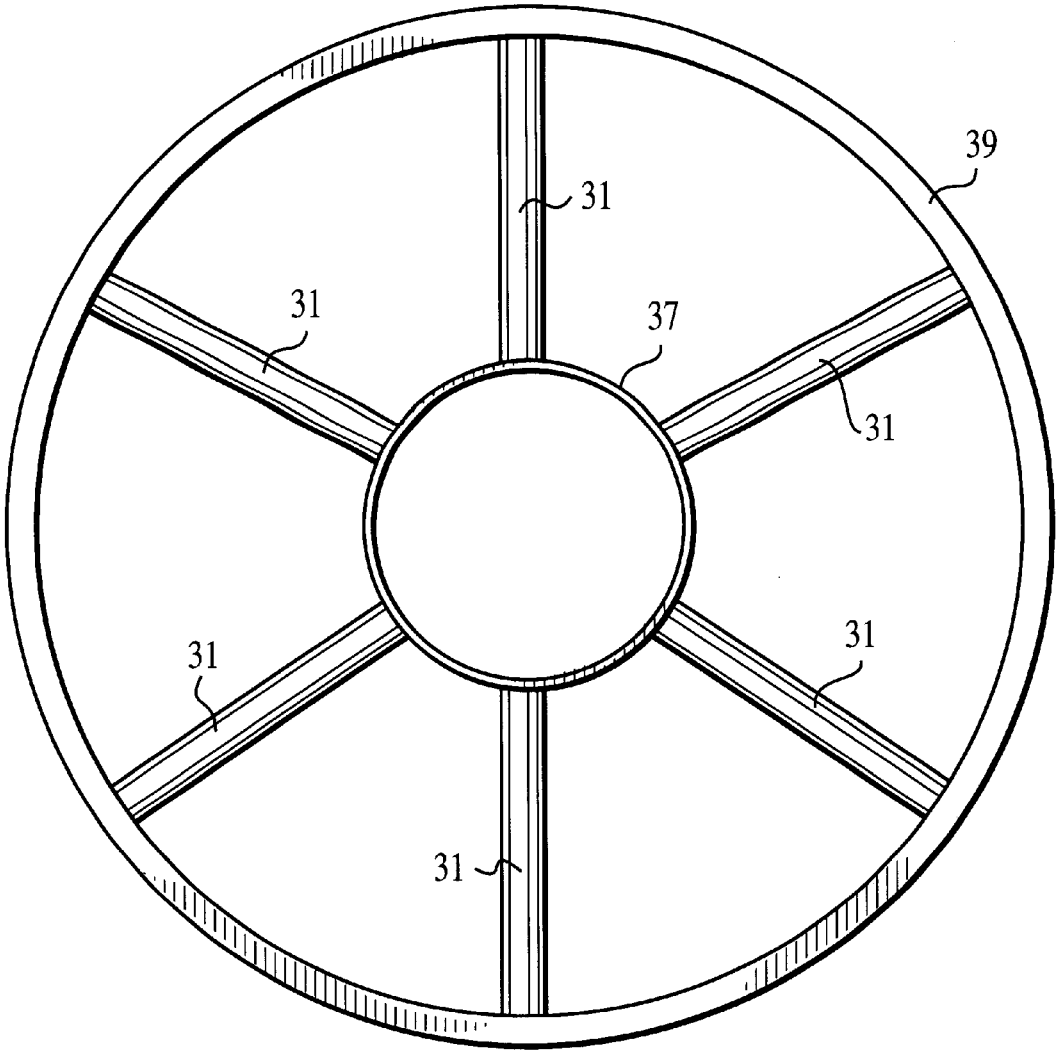
FIG. 7*b* shows spoke inserts in a configuration that includes two concentric rings to provide additional support to the insert.
Figure 8:
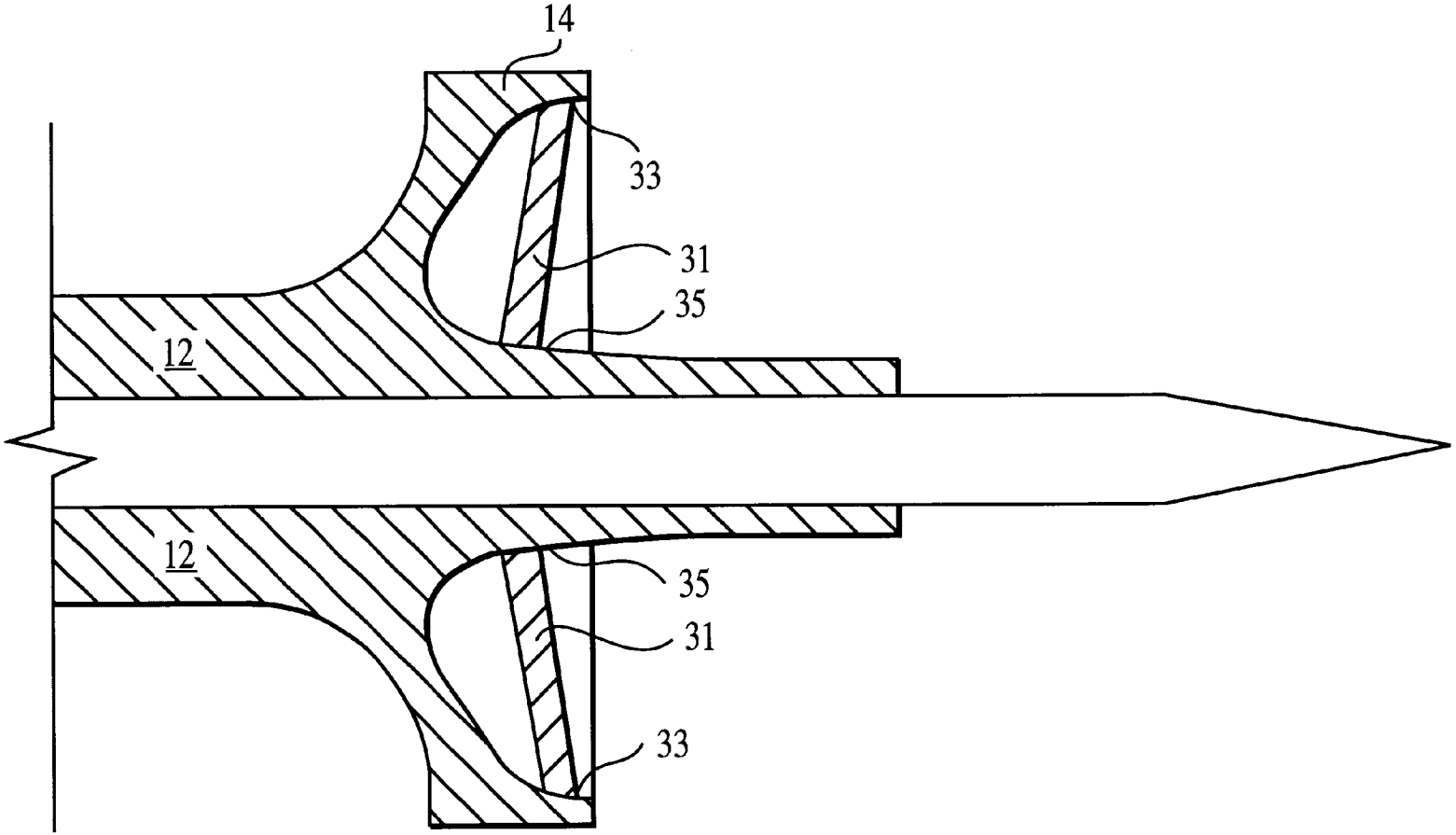
FIG. 8 is a longitudinal sectional side view of the front section of the sabot of FIG. 7*a* showing spoke inserts mounted between the front bourrelet and the forward ramp.

Another embodiment of the present invention is shown in FIGS. 7*a,* 7*b,* and 8. FIG. 7*a* provides a perspective view of the front portion of a sabot 12 showing a plurality of spoke inserts 31 directly affixed between the inner circumferential surface 33 of the front bourrelet 14 and the surface of the front ramp 35, thereby providing radial stiffening of the front bourrelet 14. The spokes 31 may be attached directly to the sabot as just described, or as an alternative the spokes 31 could be attached to two concentric rings 37 and 39 as depicted in FIG. 7*b,* which could then be attached to the sabot providing some additional structure for radial stiffening of the front bourrelet 14. FIG. 8 shows a sectional side view of the sabot 12 of FIG. 7*a* having front bourrelet 14 with spoke inserts 31 affixed directly to the sabot 12 to provide radial stiffening of the front bourrelet 14. Here again, the spoke inserts 31 can be made of homogenous monolithic material such as metals, plastics, or ceramics, or the spokes 31 could be made of anisotropic composite materials including fiber reinforced materials. Fiber reinforcement can be accomplished using chopped fiber, continues fiber, or woven fiber structures all of which are well known to those of ordinary skill in the art. Of course, the spokes 31 can vary in size and dimension as required by the artisan, and in order to provide significant stiffening may become wider resulting in a rib-like appearance.

Figure 9:
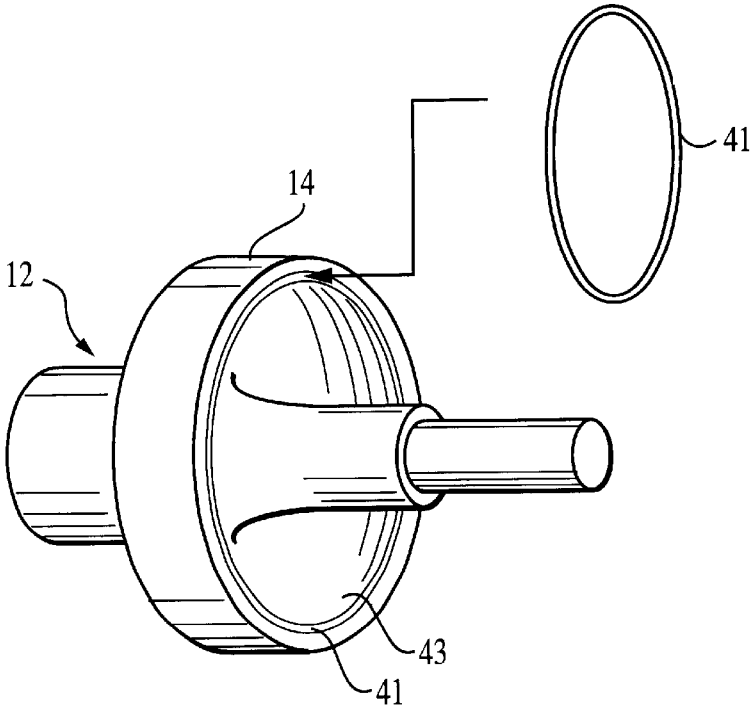
FIG. 9 is a perspective view of the front section of a sabot showing a solid ring insert affixed to the inner circumference of the front bourrelet at its forward edge.
Figure 10:
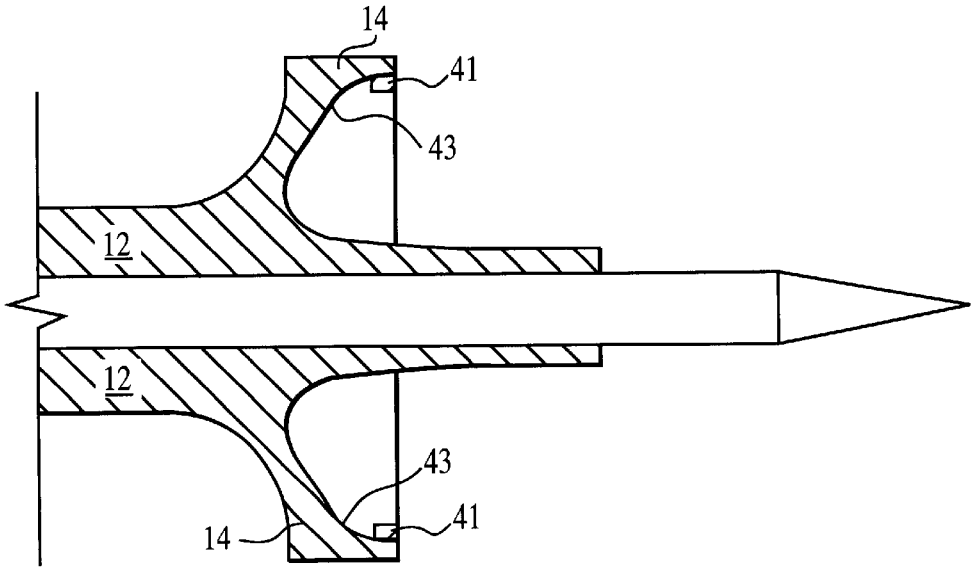
FIG. 10 is a longitudinal sectional side view of the front section of the sabot of FIG. 9 showing the solid ring insert affixed to the inside circumference of the front bourrelet at its forward edge.
Figure 11:
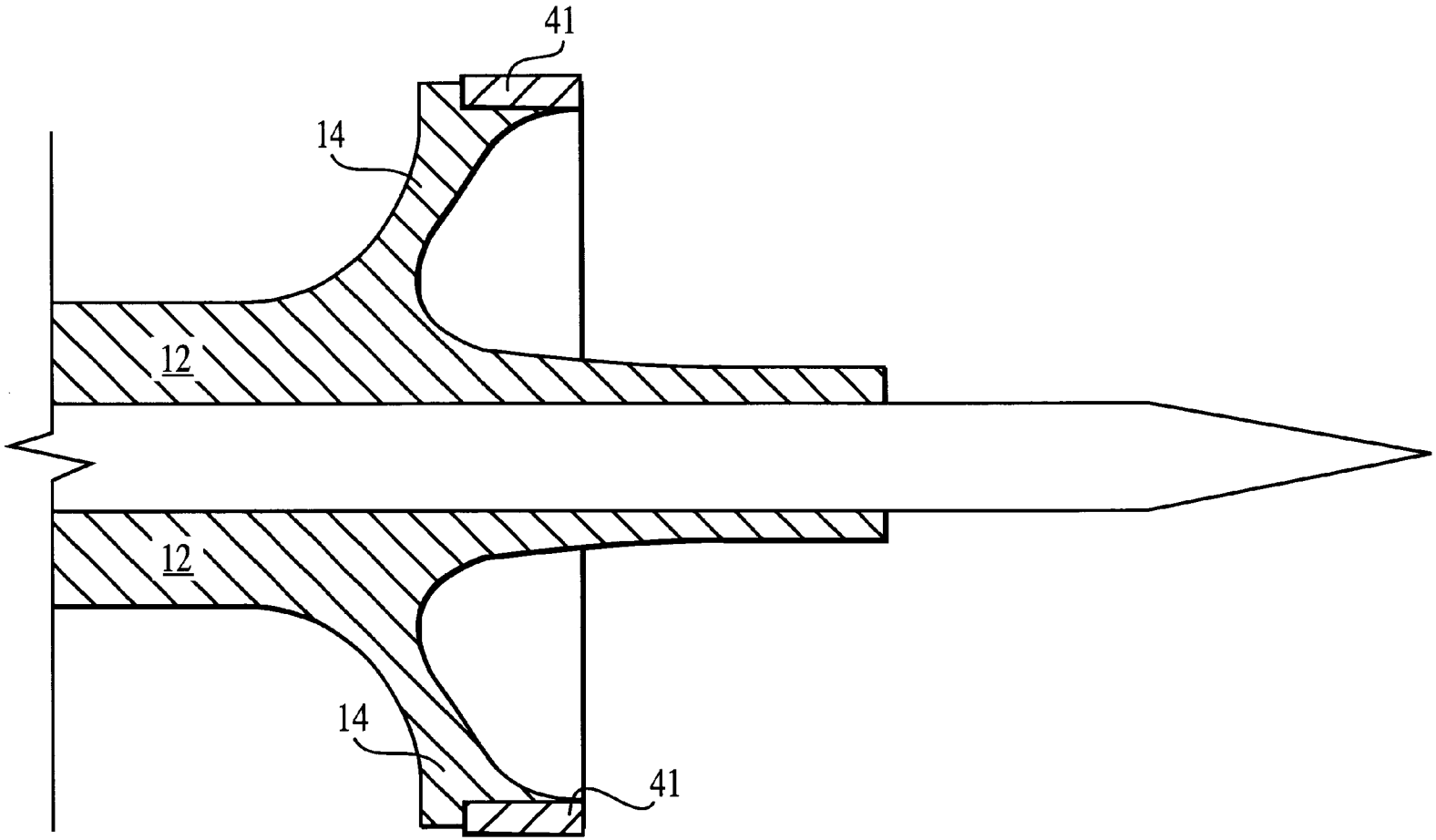
FIG. 11 is a longitudinal sectional side view of the front section of a sabot showing a solid ring insert affixed to the outside circumference of the front bourrelet at its forward edge.

Another embodiment for stiffening the front bourrelet 14 of sabot 12 is shown in perspective view in FIG. 9, and comprises a ring insert 41 which is affixed to the inner circumferential surface 43 of the forward bourrelet 14. FIGS. 10 and 11 provide sectional side views showing the ring insert 41 affixed to the inner and outer circumferential surfaces of the forward bourrelet 14, respectively. Again, the ring insert 41 may be made of the same materials previously described, i.e., homogenous metals, plastics, or ceramics, or anisotropic composite fiber reinforced materials such as chopped fiber, continues fiber, or woven fiber structures. Furthermore, the ring insert 41 can be made as a structure having an I-shaped cross-section geometry and fit to the inside surface of the forward bourrelet 14 to maximize the bending stiffness to weight ratio. Moreover, the ring insert 41 can be made of composite material having fibers oriented in the hoop or the circumferential direction to maximize the bending stiffness. In addition, another advantage of making the ring 41 out of composite material is that it can be made brittle enough to ensure easy failure during sabot 12 discard. More preferably, the ring 41 can be slotted so that it easily breaks during sabot discard as the petals of sabot 12 open during flight.

Figure 12:
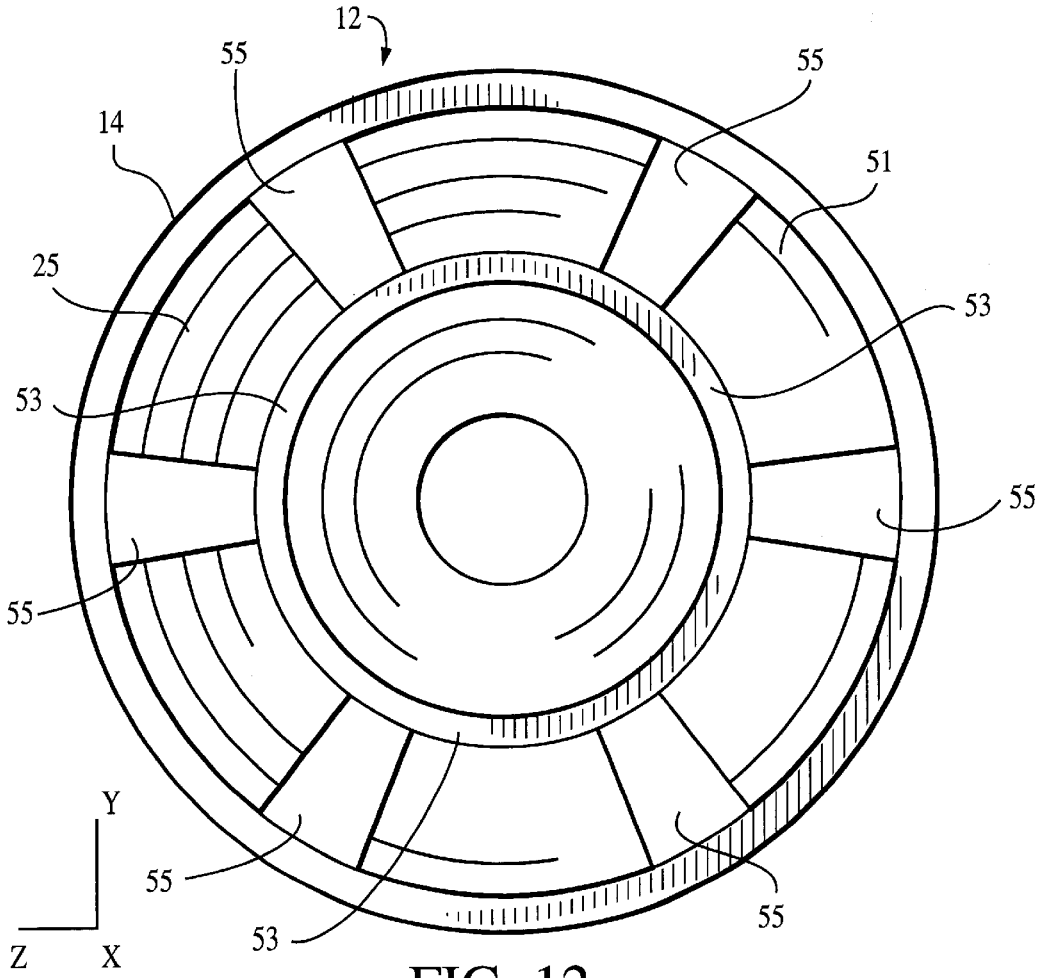
FIG. 12 shows a rib-stiffener device suitable for insertion into the inside surface of the bourrelet.
Figure 13:
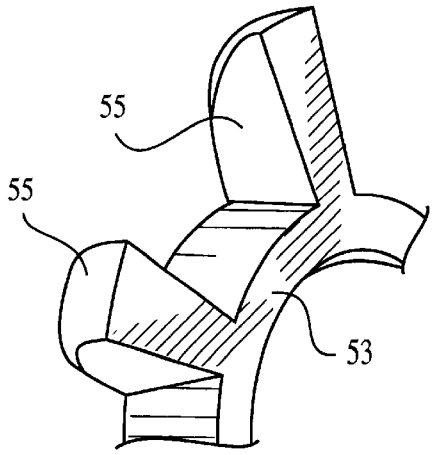
FIG. 13 is a perspective view of a single 120° section of the rib-stiffener device of FIG. 12.

For each of the foregoing embodiments, identical methods can be used to attach the various inserts to the sabot bourrelet. These methods include, but are not limited to, using epoxy adhesive, using a welded surface, using various types of mechanical fasteners, or simply using a friction/interference snug fit. For example, the ribbed stiffener device 51 of FIG. 12 has been affixed to the scoop 25 of the forward bourrelet 14 of a typical sabot 12 using both a tight press fit and epoxy adhesive. The ribbed device 51 comprises three independent sections 53 each of 120°, as shown in FIG. 13, and was made about 0.005 inches larger than the allowable space inside the forward bourrelet 14 so that it could be press-fit into position. Each section 53 includes two ribs 55 spaced apart 60°, although any suitable number of ribs may be used depending on the desired stiffness and performance level. In addition, the aft side of the ribbed device 51 allows a small clearance for application of an epoxy or other suitable adhesive. The use of an adhesive on the back surface along with a press-fit rib-stiffener 51 allows for maximum stiffening of the forward bourrelet 14. When attached, the ribbed-device 51 fits tightly between the outer surface of the front ramp 15 and the inner circumferential surface of the front bourrelet 14 as shown in FIG. 12. The press fit design ensures that there is no compliant layer of adhesive on the inner or outer radiuses of the rib stiffener 51 which could allow small deformations of the bourrelet.

Manufacturing techniques which could be used to make the inserts include, but are not limited to, machining, weaving, stamping, forging, extruding, resin transfer molding (RTM), and curing. For example, a stiffening insert such as the ribbed-stiffener 51 of FIG. 12 can be manufactured through injection molding a suitable polymer such as Acrylonitrile-Butadiene-Styrene (ABS). The rib stiffener 51, or most any other insert, can be molded by injecting melted polymer resin such as ABS into the mold and then allowing the mold to cool to form a solid part. The stiffness of the injection-molded part can be controlled by adding a small amount of carbon or glass fibers to the resin.

A prototype composite ribbed-stiffener 51 such as that shown in FIGS. 12 and 13 has been manufactured and attached to the forward bourrelet 14 of a projectile using the methods described above. The ribbed stiffener 51 was then tested by pushing inwardly on the forward bourrelet in the radial direction. The ribbed-stiffener 51 increased the radial stiffness of the forward bourrelet by 75% as compared to the unreinforced projectile.

The present invention can also be applied to the aft bourrelet 19. Although all of the foregoing describes modifications to the forward bourrelet 14, it is not intended that the present invention be limited in application to only the forward bourrelet 14. If the aft bourrelet 19 is undercut, the present invention may be applied to the aft bourrelet 19 in exactly the same manner as has been described for the forward bourrelet 14.

Furthermore, although an important aspect of the present invention provides the ability to improve the performance of existing and/or fielded rounds, it must also be recognized that the principals of the invention can also be applied to rounds/projectiles in development. Accordingly, developmental rounds could be produced having integral bourrelet structures which provide further stiffening and thus improved performance.

Figure 14:
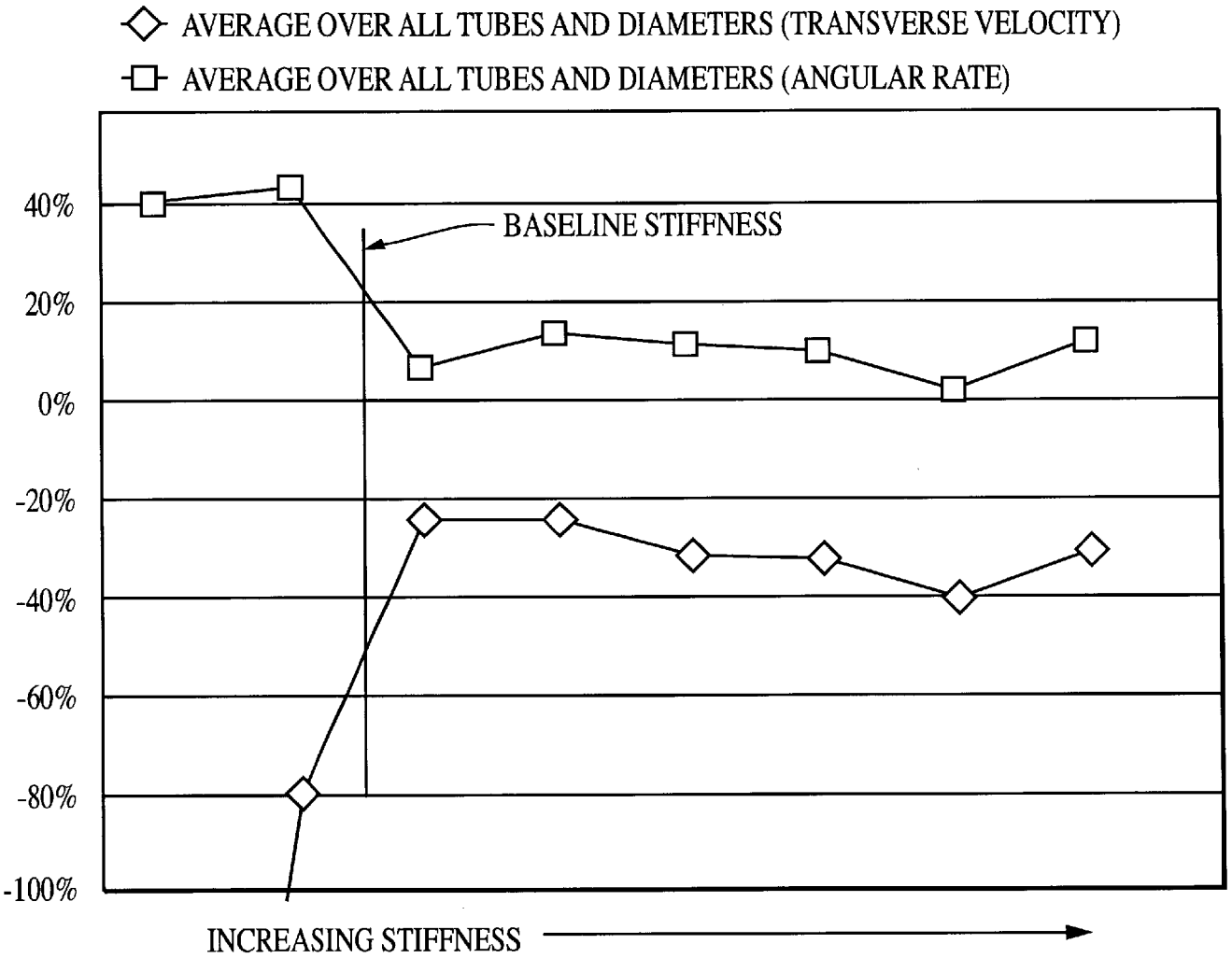
FIG. 14 is a graph showing the magnitude of improvements in the angular rates and transverse velocities for projectiles as a unction of increasing bourrelet stiffness.
Figure 15:
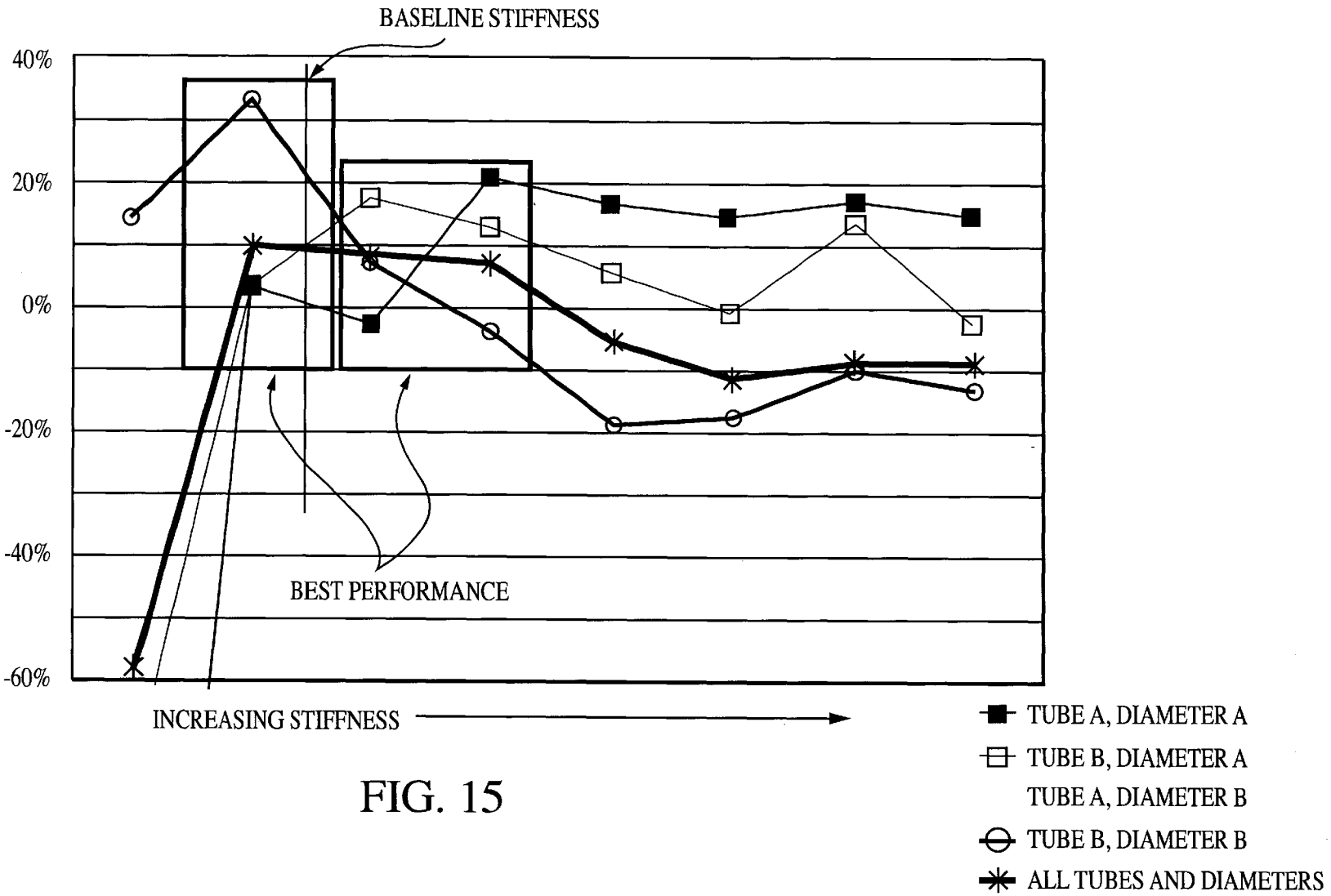
FIG. 15 is a graph showing total improvement in jump for a projectile as a function of increasing bourrelet stiffness.

In operation the present invention serves to improve shot accuracy, i.e., decrease shot dispersion, by reducing both transverse velocities and transverse angular rates for projectiles. Specifically, this is accomplished by changing the stiffness of the bourrelets. FIG. 14 is a graph showing the magnitude of improvement in angular rates and transverse velocities for increasing stiffness when compared to baseline stiffness. Of course, overall increase in performance for the projectiles must be measured by the total jump. FIG. 15 is a graph showing the improvement in total jump at muzzle exit showing a net performance increase for three of the designs.

While the invention has been described in this specification with some particularity, it will be understood that it is not intended to limit the invention to the particular embodiments provided herein. On the contrary, it is intended to cover all alternatives, modifications, and equivalents as may be included within the spirit and scope of the invention as defined in the appended claims.

What is claimed is:

1. A method of tuning the performance of saboted projectiles, said sabot including at least one bourrelet, said bourrelet having a forward inner surface and an aft outer surface, said method comprising attaching a stiffening means to said at least one bourrelet so that adverse dynamic perturbations to said projectile during projectile launch are decreased.

2. The method of claim 1, wherein said stiffening means comprises a disk-shaped insert and wherein said insert is attached to the forward inner surface of said bourrelet.

3. The method of claim 2, wherein said sabot comprises a plurality of petals and said disk-shaped insert comprises segments equal in number to the petals of said sabot so that each of said segments can be individually attached to each of said petals.

4. The method of claim 1, wherein said stiffening means comprises a disk-shaped insert and wherein said insert is attached to the aft outer surface of said bourrelet.

5. The method of claim 4, wherein said sabot comprises a plurality of petals and said disk-shaped insert comprises segments equal in number to the petals of said sabot so that each of said segments can be individually attached to each of said petals.

6. The method of claim 1, wherein said sabot includes a forward ramp and wherein said stiffening means comprises spokes, said spokes attached to the inner surface of said bourrelet and said forward ramp of said sabot.

7. The method of claim 6, wherein said spokes further include one concentric ring connected to an end of each spoke so that said spokes extend radially from said ring and are substantially coplanar.

8. The method of claim 6, wherein said spokes further include two concentric rings, each of said rings connected to an end of each spoke so that said spokes are substantially coplanar.

9. The method of claim 1, wherein said bourrelet includes an inner circumferential surface and an outer circumferential surface, and said stiffening means comprises a ring attached to said inner circumferential surface.

10. The method of claim 9, wherein said ring is slotted so that it easily breaks upon sabot discard during projectile flight.

11. The method of claim 9, wherein said ring is made of a reinforced composite material having fibers oriented in a circumferential direction.

12. The method of claim 1, wherein said bourrelet includes an inner circumferential surface and an outer circumferential surface, and said stiffening means comprises a ring attached to said outer circumferential surface.

13. The method of claim 12, wherein said ring is slotted so that it easily breaks upon sabot discard during projectile flight.

14. The method of claim 12, wherein said ring is made of a reinforced composite material having fibers oriented in a circumferential direction.

15. The method of claim 1, wherein said stiffening means is made of a material selected from the group consisting of plastics, metals, ceramics, and composite materials.

16. The method of claim 1, wherein said attaching is accomplished by a technique selected from the group consisting of welding, using adhesives, using mechanical fasteners, and using a friction-interference snug fit.

17. A projectile, comprising;

(a) a penetrator rod;

(b) a sabot affixed to and surrounding a portion of said penetrator rod, said sabot including at least one bourrelet, said bourrelet having a forward inner surface and an aft outer surface; and (c) means for stiffening said bourrelet so that adverse dynamic perturbations to said projectile during projectile launch are reduced and thus shot accuracy is improved.

18. The projectile of claim 17, wherein said stiffening member is selected form the group consisting of a disk-shaped member, a ring member, and a spoked member.

19. The projectile of claim 17, wherein said stiffening means comprises a separate insert attached to said bourrelet.

20. The projectile of claim 19, wherein said insert is selected from the group consisting of a disk-shaped insert, a ring insert, and a spoked insert.

21. The projectile of claim 20, wherein said disk-shaped insert is attached to said forward inner surface of said bourrelet.

22. The projectile of claim 20, wherein said disk-shaped insert is attached to said aft outer surface of said bourrelet.

23. The projectile of claim 20, wherein said sabot comprises a plurality of petals and said disk-shaped insert comprises segments equal in number to the petals of said sabot, each of said segments being individually attached to each of said petals.

24. The projectile of claim 20, wherein said bourrelet includes an inner circumferential surface and an outer circumferential surface, and said ring insert is attached to said inner circumferential surface.

25. The projectile of claim 20, wherein said bourrelet includes an inner circumferential surface and an outer circumferentail surface, and said ring insert is attached to said outer circumferential surface.

26. The projectile of claim 20, wherein said ring is slotted so that it easily breaks upon sabot discard during projectile flight.

27. The projectile of claim 20, wherein said ring is made of a reinforced composite material having fibers oriented in a circumferential direction.

28. The projectile of claim 20, wherein said sabot includes a forward ramp and wherein said spoked insert is attached to the inner surface of said bourrelet and said forward ramp of said sabot.

29. The projectile of claim 27, wherein said spoked insert further includes concentric rings, each of said rings connected to an end of each spoke so that said spokes are substantially coplanar.

30. The projectile of claim 19, wherein said insert is made of a material selected form the group consisting of plastics, metals, ceramics, and composite materials.

31. The projectile of claim 19, wherein said attachment is accomplished by a technique selected from the group consisting of welding, using adhesives, using mechanical fasteners, and using a friction-interference snug fit.

32. A method of tuning the performance of saboted projectiles, said sabot including at least one bourrelet, said method comprising removing material from the bourrelet structure so that the stiffness of the bourrelet is decreased.

33. The method of claim 32, wherein said removal of material is accomplished by machining material away from the bourrelet surface.

* * * * *